United States Patent [19]

Kanamaru et al.

[11] Patent Number: 5,434,014
[45] Date of Patent: Jul. 18, 1995

[54] MAGNETIC RECORDING MEDIUM AND METHOD OF MANUFACTURING SAME

[75] Inventors: Masayuki Kanamaru, Yokohama; Takashi Hikosaka, Tokyo; Reiji Nishikawa, Yokohama, all of Japan

[73] Assignee: Kabushiki Kaisha Toshiba, Kawasaki, Japan

[21] Appl. No.: 112,229

[22] Filed: Aug. 27, 1993

Related U.S. Application Data

[63] Continuation of Ser. No. 914,009, Jul. 14, 1992, abandoned, which is a continuation of Ser. No. 549,918, Jul. 9, 1990, abandoned.

[30] Foreign Application Priority Data

Jul. 10, 1989 [JP] Japan .................................. 1-177564
Dec. 20, 1989 [JP] Japan .................................. 1-328243

[51] Int. Cl.$^6$ .......................... G11B 5/66; B65D 75/00
[52] U.S. Cl. .................. 428/694 T; 428/332; 428/336; 428/611; 428/694 ST; 428/694 SL; 428/701; 428/702; 428/704; 428/900; 428/928; 204/192.1; 204/192.12; 204/192.14; 204/192.15; 204/192.2
[58] Field of Search ............... 428/611, 678, 670, 900, 428/928, 694 T, 332, 336, 694 ST, 694 SL, 701, 702, 704; 204/192.2, 192.1, 192.12, 192.14, 192.15; 427/127

[56] References Cited

U.S. PATENT DOCUMENTS

| | | | |
|---|---|---|---|
| 4,711,810 | 12/1987 | Ando et al. .................. | 428/694 |
| 4,749,459 | 6/1988 | Yamashita et al. ............. | 204/192.2 |
| 4,749,628 | 12/1988 | Ahlert et al. .................. | 428/900 |
| 4,789,598 | 12/1988 | Howard et al. .................. | 428/694 |
| 4,898,774 | 2/1990 | Yamashita et al. .................. | 428/694 |
| 4,928,514 | 5/1990 | Natarajan et al. .................. | 428/611 |
| 4,988,578 | 1/1991 | Yamashita et al. .................. | 428/678 |
| 5,066,552 | 11/1991 | Howard .................. | 428/694 |
| 5,147,734 | 9/1992 | Nakamura .................. | 428/694 |
| 5,352,501 | 10/1994 | Miyamoto .................. | 428/64 |

FOREIGN PATENT DOCUMENTS

| | | |
|---|---|---|
| 61-276115 | 1/1985 | Japan . |
| 61-194635 | 2/1985 | Japan . |
| 61-242321 | 4/1985 | Japan . |
| 61-246914 | 4/1985 | Japan . |
| 61-250827 | 4/1985 | Japan . |
| 61-253622 | 4/1985 | Japan . |
| 6247818 | 8/1985 | Japan . |
| 63-187414 | 11/1987 | Japan . |

OTHER PUBLICATIONS

Journal of Applied Physics, vol. 53, No. 10, p. 6941; "Effect of Nitrogen on the High Coercivity and Microstructures of Co-Ni Alloy Films"; Oct. 1982.

Journal of Applied Physics, vol. 53, No. 8; p. 3263; "The Effect of Cr and W Nucleation Layers on the Magnetic Properties of CoPt Films"; Howard; Apr. 15, 1988.

*Primary Examiner*—L. Kiliman
*Attorney, Agent, or Firm*—Oblon, Spivak, McClelland, Maier & Neustadt

[57] ABSTRACT

A thin film type longitudinal magnetic recording medium is manufactured by forming a magnetic layer of $Co_{1-x-y}Pt_xCr_y$, ($0.15 < x \leq 0.35$; $0 < y \leq 0.15$), on a substrate. The magnetic layer is formed by sputtering under an inert gas atmosphere containing 0.1 to 15% by volume of at least one of $N_2$ and $O_2$.

20 Claims, 10 Drawing Sheets

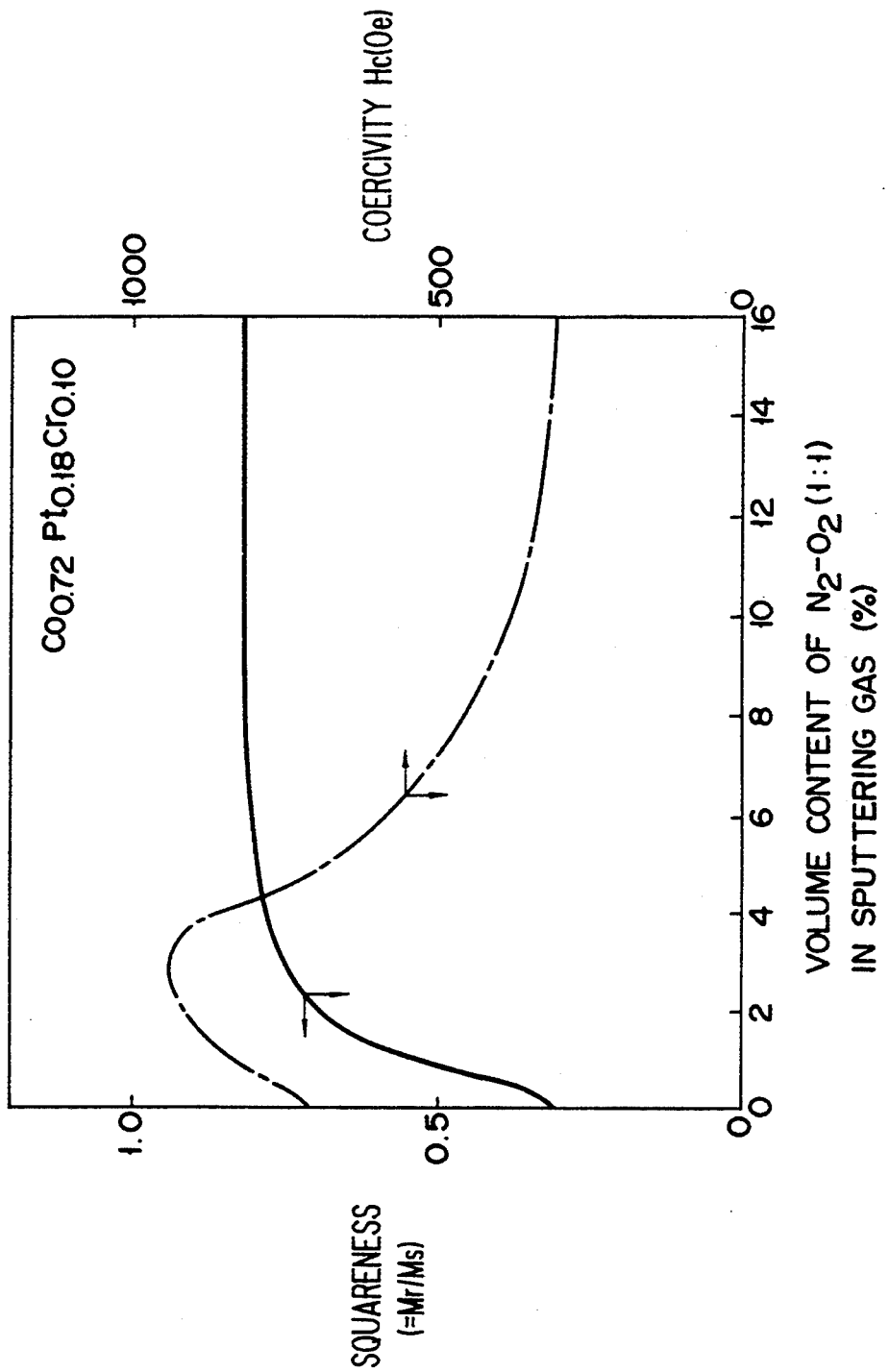
F I G. 4

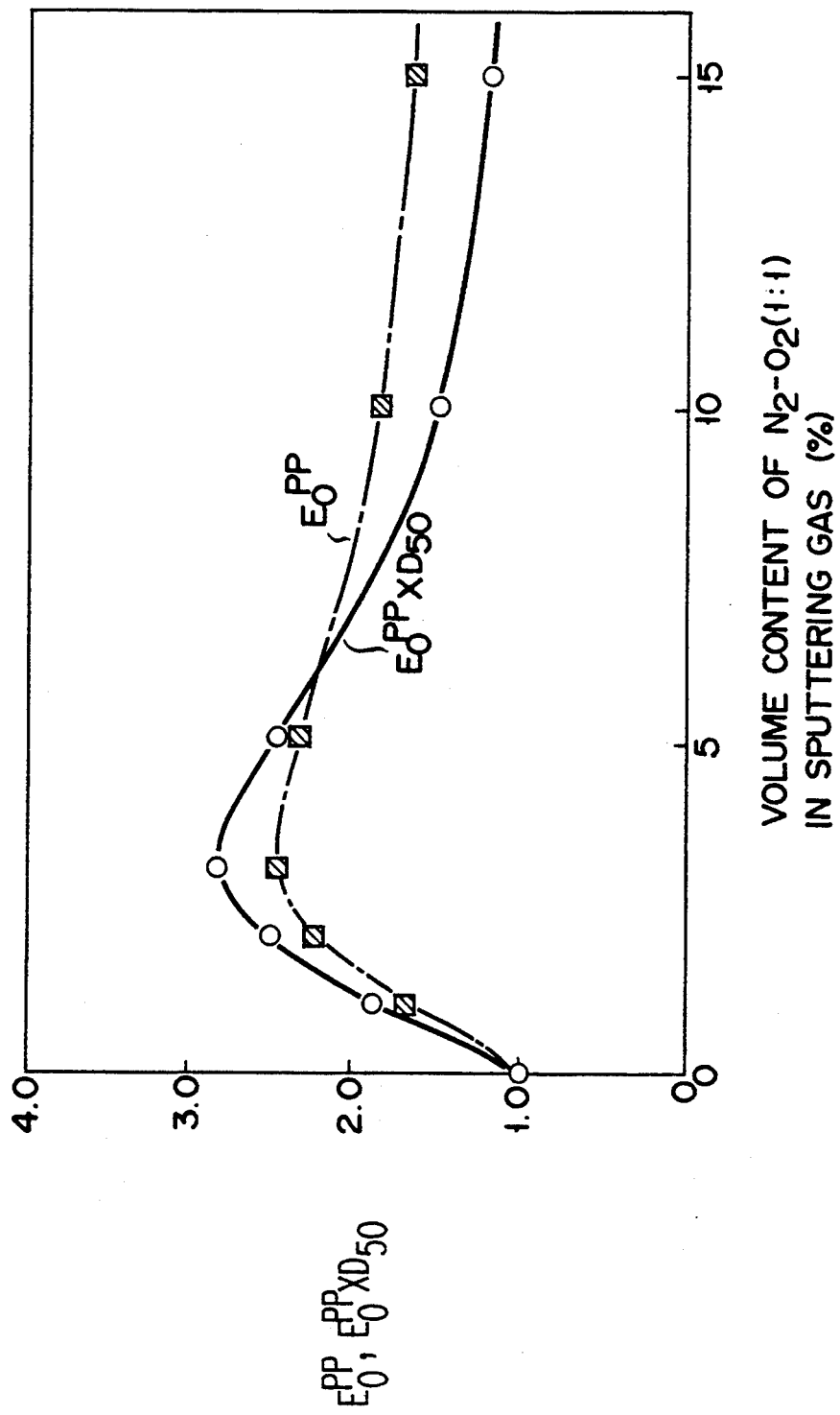
F I G. 7

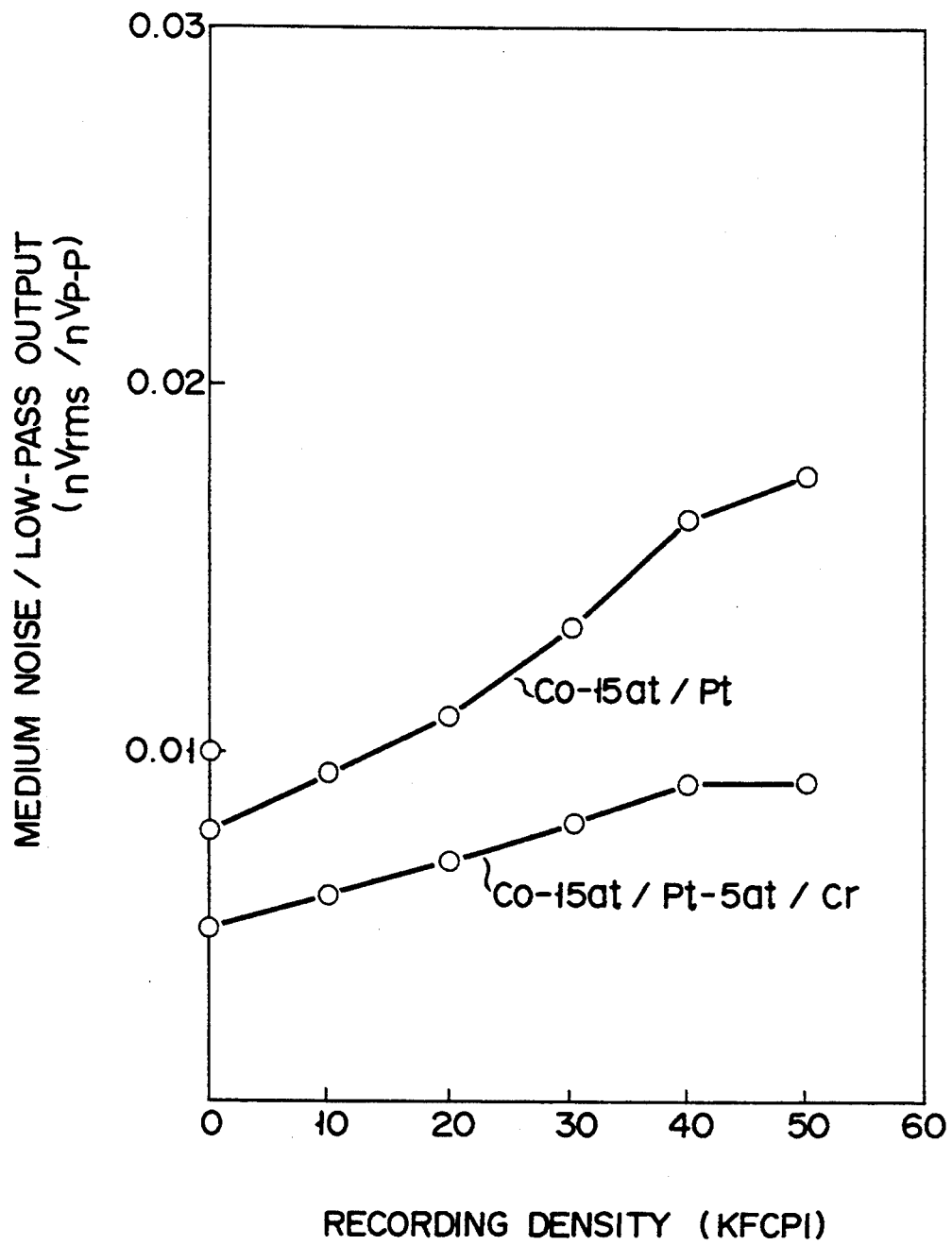
F I G. 8

MAGNETIC RECORDING MEDIUM AND METHOD OF MANUFACTURING SAME

This application is a continuation of application Ser. No. 07/914,009, filed on Jul. 14, 1992, now abandoned, which is a continuation of Ser. No. 07/549,918, filed on Jul. 9, 1990, also abandoned.

BACKGROUND OF THE INVENTION

1. Field of the Invention

The present invention relates to a thin film type longitudinal magnetic recording medium and a method of manufacturing the same.

2. Description of the Related Art

A thin film type longitudinal magnetic recording medium is advantageous over the conventional magnetic recording medium of coating type in that the magnetic layer can be made thinner and that a high coercivity and a high saturated magnetization can be obtained easily. Thus, the thin film type longitudinal magnetic recording medium is adapted basically for the high density recording. Particularly, where Co-based alloys are used for forming the magnetic layer, the saturated magnetization is greater than in the use of magnetic oxide, making it possible to increase the head terminal output.

The magnetic properties of a longitudinal magnetic recording medium comprising a magnetic layer formed of a Co-based alloy such as Co—Pt alloy depend greatly on the crystal structure and crystal orientation of the magnetic layer. Also, the crystal structure and the crystal orientation of the magnetic layer are greatly dependent on the film-forming method and the film-forming conditions. Thus, in many cases, it is impossible to ensure the properties required for the longitudinal magnetic recording medium by simply defining the composition of the magnetic layer.

In the conventional longitudinal magnetic recording medium comprising a magnetic layer consisting of a Co-based alloy, a particular film construction and a film-forming method are employed in order to control the crystal structure and the crystal orientation of the magnetic layer. For example, a magnetic recording medium prepared by successively forming on a substrate an underlayer consisting of Cr and a magnetic layer consisting of a Co-based alloy which may possibly contain a third element is described in (Opfer et al., "Thin-Film Memory Disc Development", Hewlett-Packard Journal, November, 1985, pp.4–10). The Cr underlayer used in this prior art is intended to control the coercivity of the magnetic layer. However, use of the underlayer results in an increased manufacturing cost of the magnetic recording medium.

Published Examined Japanese Patent Application No. 63-13256 discloses another prior art. In this prior art, a magnetic layer consisting of a Co—Pt alloy or a ternary alloy such as Co—Pt—Ni is formed on a substrate by sputtering under an inert gas atmosphere containing 35 to 70% of $N_2$, followed by a heat treatment so as to manufacture a desired magnetic recording medium. The method of this prior art certainly permits improving the coercivity of the magnetic layer. However, requirement of the heat treatment after formation of the magnetic layer leads to a high manufacturing cost of the magnetic recording medium.

An additional prior art is disclosed in Published Unexamined Japanese Patent Application No. 01-144217. In this prior art, a magnetic layer consisting of a Co—Pt alloy or a ternary alloy such as Co—Pt—Ni is formed on a substrate by sputtering under an inert gas atmosphere containing less than 1% of $N_2$ or $O_2$. This method permits improving the coercivity of the magnetic layer. In addition, the manufacturing cost of the recording medium is not increased because a Cr underlayer need not be formed and the heat treatment after formation of the magnetic layer need not be employed in this prior art.

On the other hand, it is important to improve the corrosion resistance of a metal magnetic layer because the metal magnetic layer is corrosive. The corrosion resistance of the Co—Pt alloy noted above can be markedly improved by adding Cr to the alloy. However, the magnetic properties are markedly deteriorated if a magnetic layer consisting of a Co—Pt—Cr alloy containing a large amount of Cr is formed by the conventional method. When the Cr content is small, the magnetic properties of the magnetic layer are changed depending on the type of the sputtering apparatus used even if the same sputtering conditions are set for forming the magnetic layer. In short, it is difficult to obtain desired magnetic properties. In particular, where the magnetic layer is formed at a high speed, it is difficult to obtain desired magnetic properties. To reiterate, where it is intended to obtain a Co—Pt—Cr alloy magnetic layer having a high corrosion resistance by the conventional method without using a Cr underlayer and without employing a heat treatment after formation of the magnetic layer, it is substantially impossible to obtain a magnetic layer having magnetic properties adapted for a longitudinal magnetic recording medium depending on the sputtering apparatus used.

The magnetic properties of the Co—Pt—Cr alloy magnetic layer are deeply related to the easy axis of magnetization of the alloy, i.e., orientation of the [0001] axis (C-axis) of the hexagonal close packed (HCP) phase. In a magnetic film of deteriorated magnetic properties, the C-axis is oriented in a direction perpendicular to the film surface, resulting in a small squareness.

Presently, it is impossible to theoretically explain how the material, sputtering apparatus and sputtering conditions are related to the crystal orientation of the magnetic layer, making it impossible to design the sputtering apparatus based on the complete analysis of the magnetic properties of the magnetic layer to be formed.

SUMMARY OF THE INVENTION

An object of the present invention is to provide a longitudinal magnetic recording medium of satisfactory properties, which permits forming a magnetic layer of Co—Pt—Cr alloy having desired magnetic properties regardless of the sputtering apparatus used for forming the magnetic layer.

According to the present invention, there is provided a magnetic recording medium, comprising a substrate and a magnetic layer formed on the substrate, said magnetic layer having a composition of:

$$Co_{1-x-y}Pt_xCr_y, (0.15 < x \leq 0.35; 0 < y \leq 0.15)$$

and containing at least one of oxygen and nitrogen in a concentration less than $5 \times 10^{21}$ atom/cm$^3$. 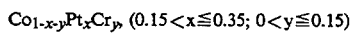

The present invention also provides a method of manufacturing a magnetic recording medium, comprising the step of forming on a substrate a magnetic layer having a composition of:

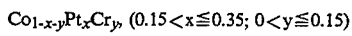
$Co_{1-x-y}Pt_xCr_y$, $(0.15 < x \leq 0.35; 0 < y \leq 0.15)$ said magnetic layer being formed by sputtering method under an inert gas atmosphere containing 0.1 to 15% by volume of at least one of $N_2$ and $O_2$.

The method of the present invention makes it possible to form a Co—Pt—Cr alloy magnetic layer having a high corrosion resistance and adapted for a longitudinal magnetic recording medium regardless of the sputtering apparatus used. Of course, a Cr underlayer need not be used, and a heat treatment after the magnetic layer formation need not be employed in the method of the present invention. In particularly, it is possible to use, for example, a magnetron sputtering apparatus, which permits forming a magnetic layer rapidly under a relatively low pressure, so as to form a magnetic layer having a high Cr content and, thus, exhibiting a high corrosion resistance. It follows that the magnetic recording medium of the present invention exhibits an improved squareness, leading to improvements in the electromagnetic conversion characteristics and in the corrosion resistance.

Furthermore, the magnetic recording medium of the present invention which contains Cr exhibits low noise in comparison with the medium not containing Cr.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows the relationship among the $N_2$-$O_2$ (1:1) content in the sputtering gas, the squareness and the coercivity, with respect to a sample of magnetic recording medium manufactured in Example 1;

FIG. 7 shows the relationship among the $N_2$-$O_2$ (1:1) content in the sputtering gas, EoP-P and EoP-P×$D_{50}$, with respect to a sample of magnetic recording medium manufactured in Example 1;

FIG. 8 shows the relationship between the recording density and the noise/output ratio, with respect to a sample of magnetic recording medium manufactured in Example 1;

PREFERRED EMBODIMENT OF THE INVENTION

Figure 1:
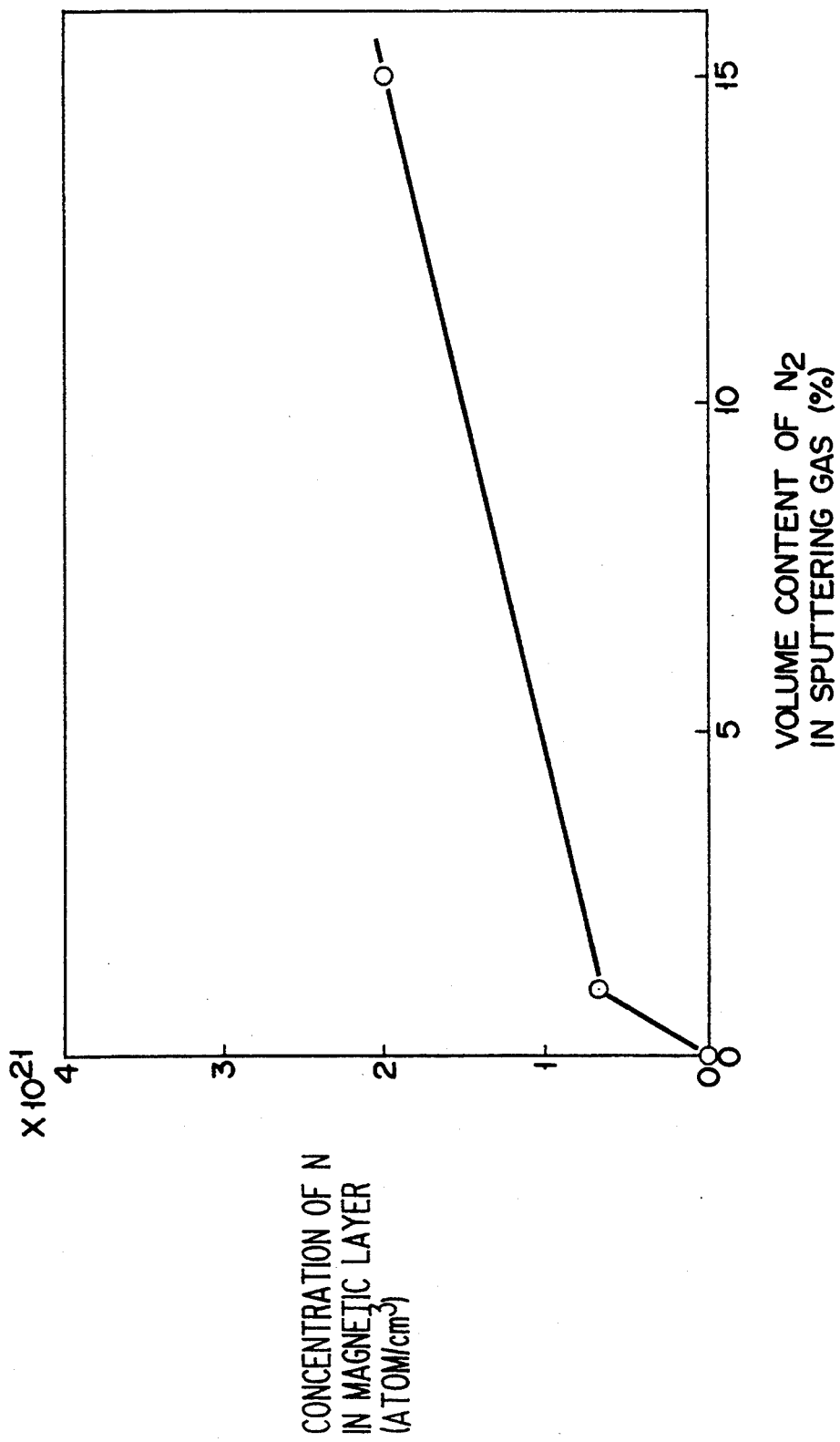
FIG. 1 shows the relationship between the $N_2$ content in the sputtering gas and the nitrogen concentration in the magnetic layer, with respect to a sample of magnetic recording medium manufactured in Example 1.

The substrate included in the magnetic recording medium of the present invention is not particularly restricted, as far as the substrate material is nonmagnetic. For example, it is possible to use a metal, glass or organic film as the substrate. The sputtering apparatus used is not restricted either. For example, it is possible to use a DC magnetron sputtering apparatus, RF magnetron sputtering apparatus or RF sputtering apparatus for forming the magnetic layer included in the magnetic recording medium.

The sputtering gas used in the present invention is provided by an inert gas such as Ar, Xe, which should contain 0.1 to 15% by volume of at least one of $N_2$ and $O_2$. Where the $N_2$ or $O_2$ content in the sputtering gas is lower than 0.1% by volume, the C-axis of the HCP phase of the Co—Pt—Cr alloy magnetic layer formed tends to be oriented in a direction perpendicular to the film surface. On the other hand, where the $N_2$ or $O_2$ content is higher than 15%, the face-centered cubic (FCC) phase is formed in a large amount, leading to a small coercivity. Desirably, the sputtering gas should contain 1 to 10% by volume of $N_2$ or $O_2$.

In the present invention, the composition of the magnetic layer is defined to be:

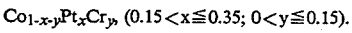
$Co_{1-x-y}Pt_xCr_y$, $(0.15 < x \leq 0.35; 0 < y \leq 0.15)$.

If the Pt content is lower than 15 atomic %, the magnetic particles become unduly small, leading to a small coercivity, even if a suitable crystal orientation is achieved. If the Pt content exceeds 35 atomic %, the FCC phase is formed in a large amount, leading to a small coercivity. In this case, the magnetic layer is unsuitable for use in a magnetic recording medium. The Cr content is also important. As described previously, a magnetic layer which does not contain Cr is unsatisfactory in corrosion resistance. If the Cr content exceeds 15 atomic %, however, the degree of magnetization is lowered, resulting in failure to meet both a high output and a high recording density simultaneously.

The atmosphere in the sputtering step is defined in the present invention, making it possible to form a magnetic layer having magnetic properties adapted for a longitudinal magnetic recording medium, said magnetic layer being formed of a Co—Pt—Cr alloy having an excellent corrosion resistance. What should be noted is that a Cr underlayer need not be used in the present invention. Also, a heat treatment after formation of the magnetic layer need not be employed in the present invention. In addition, a satisfactory magnetic layer can be formed in the present invention no matter what sputtering apparatus may be used for forming the magnetic layer. What should be noted in particular is that an apparatus which permits rapidly forming a magnetic layer under a relatively low pressure such as a magnetron sputtering apparatus can be used for forming a magnetic layer containing a large amount of Cr and, thus, exhibiting a high corrosion resistance.

EXAMPLE 1

Magnetic recording media were manufactured under the conditions given below:
Apparatus: DC magnetron sputtering apparatus
Substrate: Disc of NiP-plated Al, glass or polyimide film
Substrate temperature: Room temperature or 250° C.
Atmosphere: Ar gas containing $N_2$, $O_2$ or both $N_2$ and $O_2$ in the same amount, i.e., $N_2$–$O_2$ (1:1)
Pressure: 0.1 to 3 Pa
Composition of magnetic layer: $Co_{1-x-y}Pt_xCr_y$
Thickness of magnetic layer: 500 Å

The nitrogen atom content of a magnetic layer formed under an Ar atmosphere containing nitrogen gas was measured by secondary ion mass spectrometry (SIMS). FIG. 1 shows the relationship between the nitrogen gas content in the atmosphere and the nitrogen atom content in the formed magnetic layer. As shown in FIG. 1, the magnetic layer was found to contain $2 \times 10^{21}$ atom/cm$^3$ of nitrogen atoms in the case where the nitrogen gas content in the atmosphere was 15% by volume.

The effect of the $N_2$ and/or $O_2$ content in the sputtering gas on the squareness and coercivity was examined with respect to the manufactured magnetic recording media. Where the sputtering gas was formed of pure argon, the squareness of the magnetic layer was 0.2 to 0.5, which was unsuitable for use in a longitudinal magnetic recording medium, regardless of the kind of the substrate, substrate temperature, sputtering pressure and thickness of the magnetic layer. Where the sputtering gas contained 1 to 15% by volume of $N_2$ and/or $O_2$ gas, however, the squareness of the magnetic layer was markedly improved, i.e., the squareness was 0.65 or more.

For example, a magnetic layer of $Co_{0.8}Pt_{0.17}Cr_{0.03}$ was formed on a NiP-plated Al substrate with the substrate temperature set at room temperature. In this experiment, the sputtering gas pressure was set at 0.6 Pa and the $N_2$ gas content in the sputtering gas was changed variously so as to examine the changes in the squareness and coercivity with the change in the $N_2$ content. Table 1 shows the results. As seen from Table 1, the squareness of the magnetic layer was 0.65 or more where the $N_2$ content in the sputtering gas fell within the range of between 1% and 15%.

TABLE 1

|  | $N_2$ Content in Sputtering Gas | | | | |
| --- | --- | --- | --- | --- | --- |
|  | 0% | 1% | 2.5% | 5% | 15% |
| Squareness (Mr/Ms) | 0.2–0.5 | 0.75 | >0.8 | >0.8 | 0.65 |
| Coercivity (Oe) | 600–900 | 1250 | 1350 | 1200 | 900 |

Figure 2:
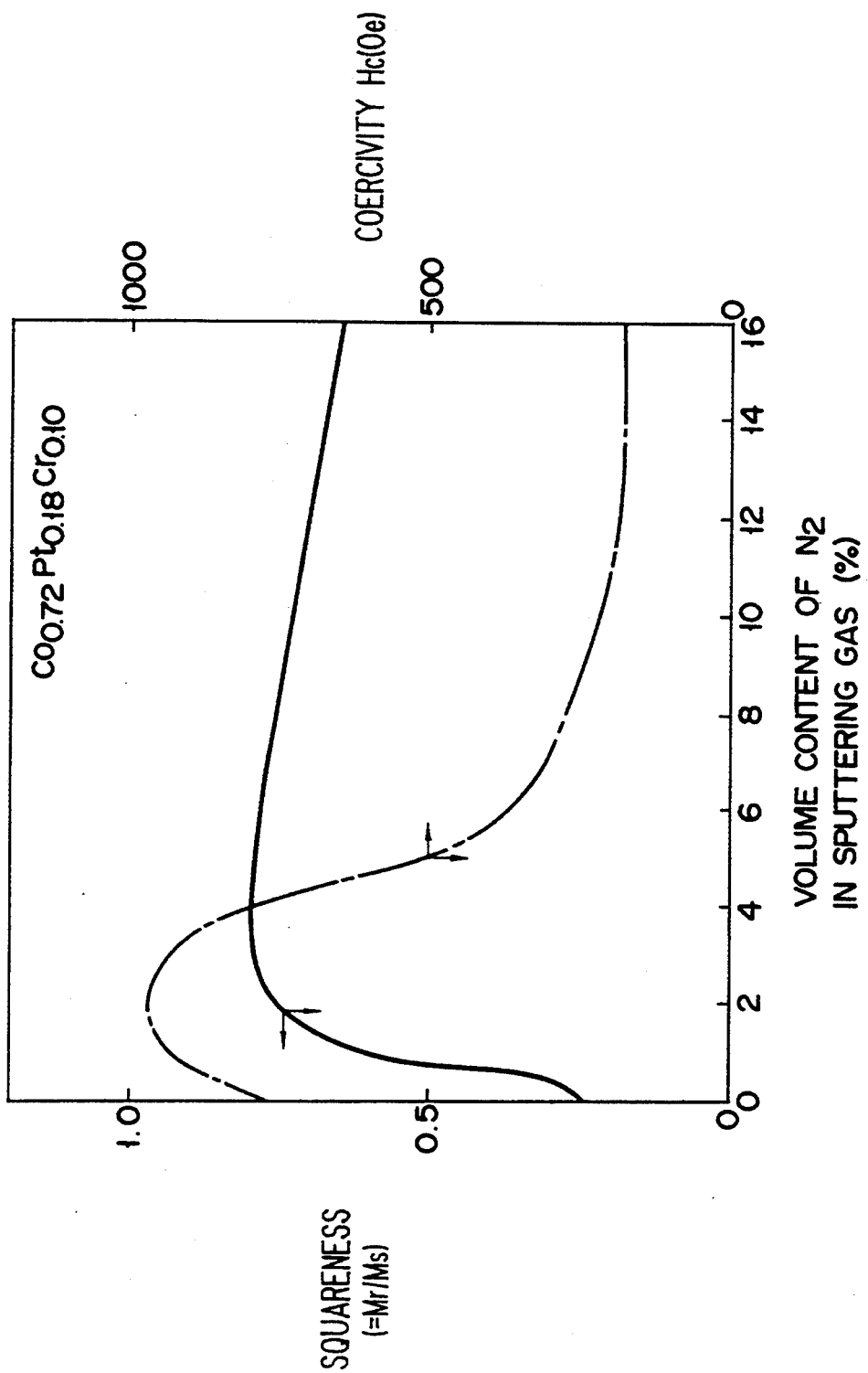
FIG. 2 shows the relationship among the $N_2$ content in the sputtering gas, the squareness and the coercivity, with respect to a sample of magnetic recording medium manufactured in Example 1.
Figure 3:
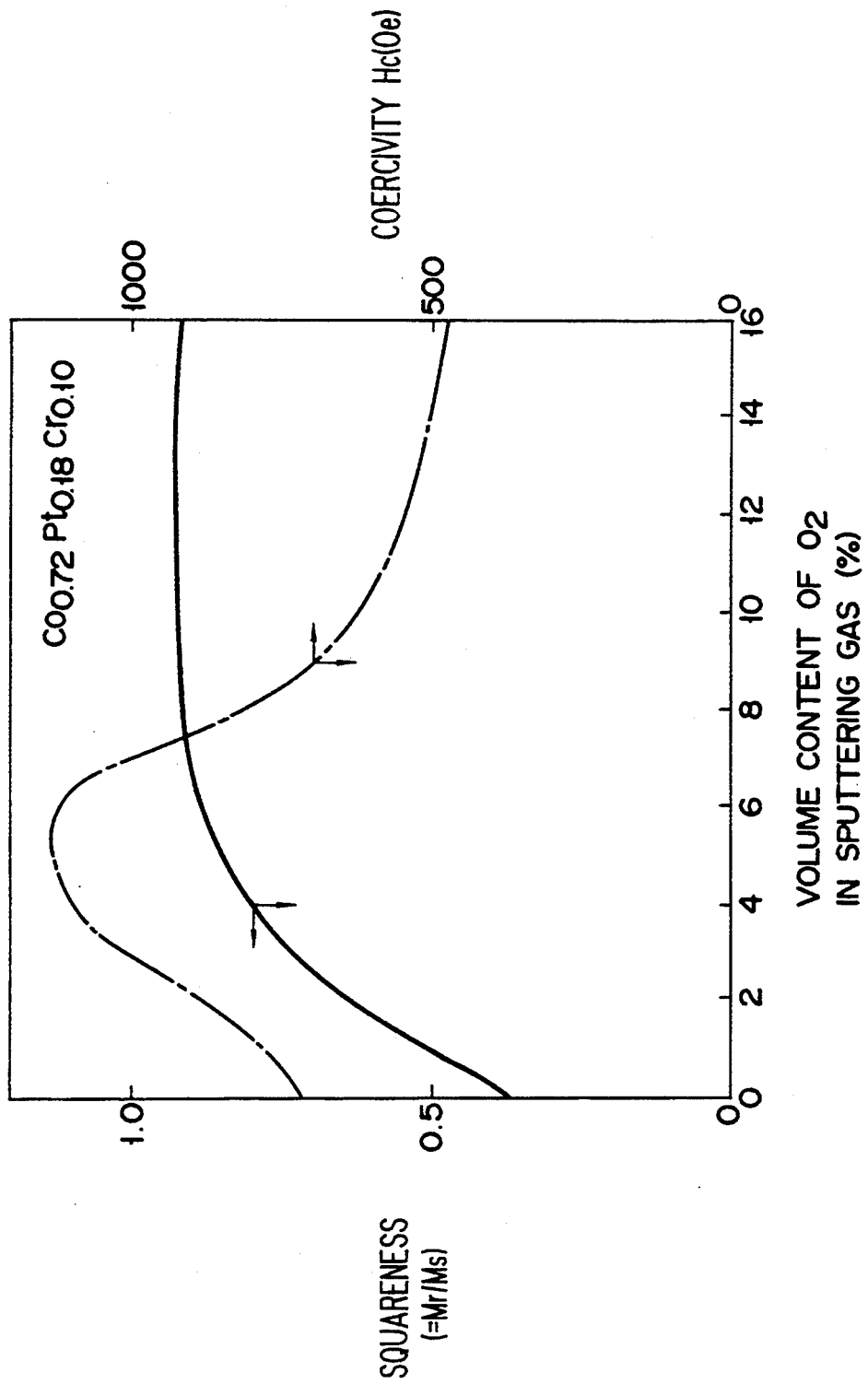
FIG. 3 shows the relationship among the $O_2$ content in the sputtering gas, the squareness and the coercivity, with respect to a sample of magnetic recording medium manufactured in Example 1.

Likewise, a magnetic layer of $Co_{0.72}Pt_{0.18}Cr_{0.10}$ was formed on a NiP-plated Al substrate with the substrate temperature set at room temperature. In this experiment, the sputtering gas pressure was set at 0.6 Pa and the $N_2$ and/or $O_2$ gas content in the sputtering gas was changed variously so as to examine the changes in the squareness and coercivity with the change in the $N_2$ and/or $O_2$ content. FIGS. 2 to 4 show the results, FIG. 2 covering the case where a $N_2$ gas was added to the Ar gas, FIG. 3 covering the case where an $O_2$ gas was added to the Ar gas, and FIG. 4 covering the case where a $N_2$-$O_2$ mixture (1:1) was added to the Ar gas. It is seen that each of the squareness and the coercivity for the mixture case (FIG. 4) is intermediate between the case of the $N_2$ gas addition (FIG. 2) and the case of the $O_2$ gas addition (FIG. 3). This indicates that the magnetic properties of the magnetic layer are dependent on the mixing ratio of $N_2$ to $O_2$ added to the Ar gas.

The crystal orientation of the magnetic layer was evaluated by the X-ray diffraction with respect to each of the magnetic recording media manufactured under various conditions. It has been found that, where a pure Ar gas is used as the sputtering gas, the (002) reflection of HCP phase is very strong and the C-axis is oriented in a direction perpendicular to the film surface. However, the (002) reflection of the HCP phase has been found very weak or negligible in the case where the sputtering gas is prepared by adding 1 to 15% by volume of $N_2$, $O_2$ or a 1:1 mixture of $N_2$ and $O_2$. The result of this experiment suggests that the improvement in the crystal orientation brings about an improved squareness.

Figure 5:
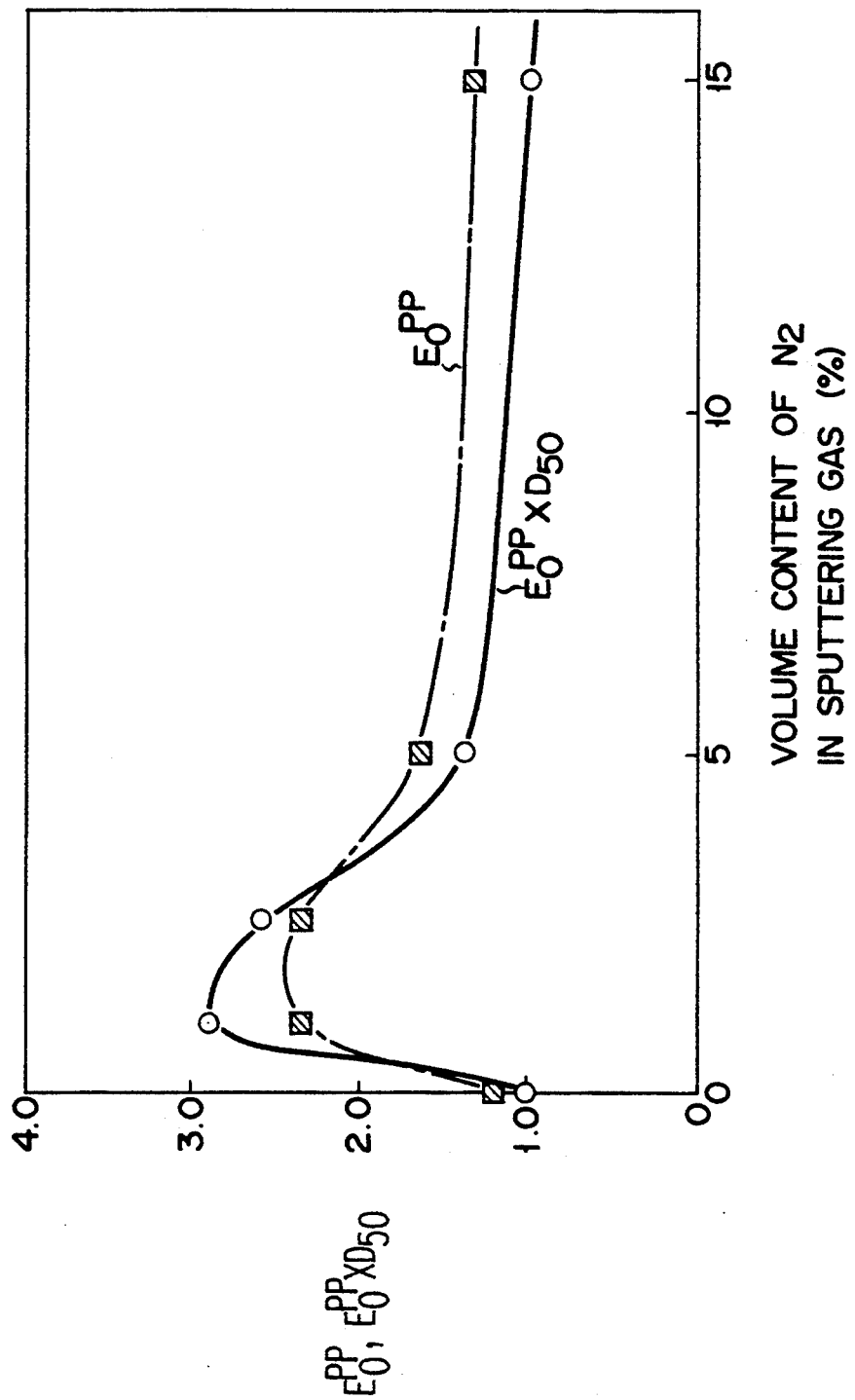
FIG. 5 shows the relationship among the $N_2$ content in the sputtering gas, EoP-P and EoP-P×$D_{50}$, with respect to a sample of magnetic recording medium manufactured in Example 1.
Figure 6:
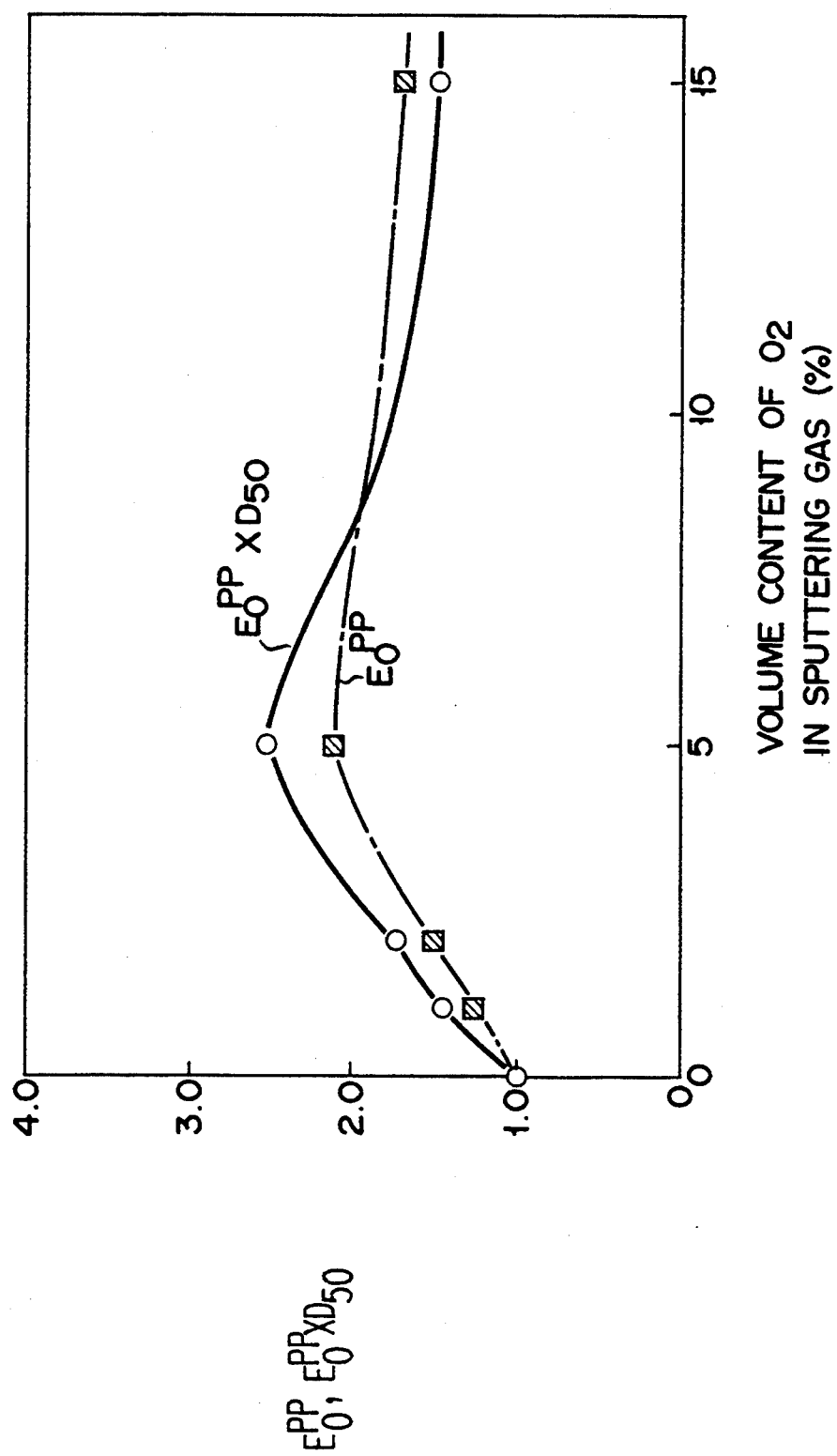
FIG. 6 shows the relationship among the $O_2$ content in the sputtering gas, EoP-P and EoP-P×$D_{50}$, with respect to a sample of magnetic recording medium manufactured in Example 1.

Further, the electromagnetic conversion properties were measured with respect to the magnetic recording media manufactured under the conditions same as those in the cases of FIGS. 2 to 4. FIGS. 5 to 7 are graphs showing the values of EoP-P and EoP-P x $D_{50}$ relative to $N_2$, $O_2$ and $N_2$-$O_2$ (1:1) content in the sputtering gas, respectively. Where, EoP-P is low pass output, and $D_{50}$ is recording density when an output a half of EoP-P is obtained. Incidentally, these values are normalized by the value in the case of 100% Ar gas. As seen from the graphs, the use of a sputtering gas containing 1 to 15% by volume of any of $N_2$, $O_2$ and $N_2$-$O_2$ mixture is superior to the use of a 100% Ar gas in each of EoP-P and EoP-P$\times D_{50}$.

The noise properties, i.e., a change in the ratio of medium noise/low pass output relative to a change in the recording density (the unit is kiloflux charge per inch), were examined with respect to two magnetic recording media having different magnetic layers given below:
$Co_{0.85}Pt_{0.15}$
$Co_{0.8}Pt_{0.15}Cr_{0.05}$ These magnetic recording media were manufactured under the conditions given below:
Substrate: Disc of glass
Substrate temperature: Room temperature
Atmosphere: Ar gas containing 1% $N_2$
Pressure: 0.6 Pa
Thickness of magnetic layer: 500 Å

FIG. 8 shows the results. It is seen that a magnetic recording medium having a magnetic layer containing 5 atomic % of Cr is lower in noise than a medium in which Cr is not contained in the magnetic layer.

Further, the corrosion resistance (change in weight) within water was examined with respect to four magnetic recording media having different magnetic layers given below:
$Co_{0.85}Pt_{0.15}$
$Co_{0.8}Pt_{0.15}Cr_{0.05}$
$Co_{0.75}Pt_{0.15}Cr_{0.1}$
$Co_{0.5}Pt_{0.35}Cr_{0.15}$ These magnetic recording media were manufacture under the same conditions as described above.

Figure 9:
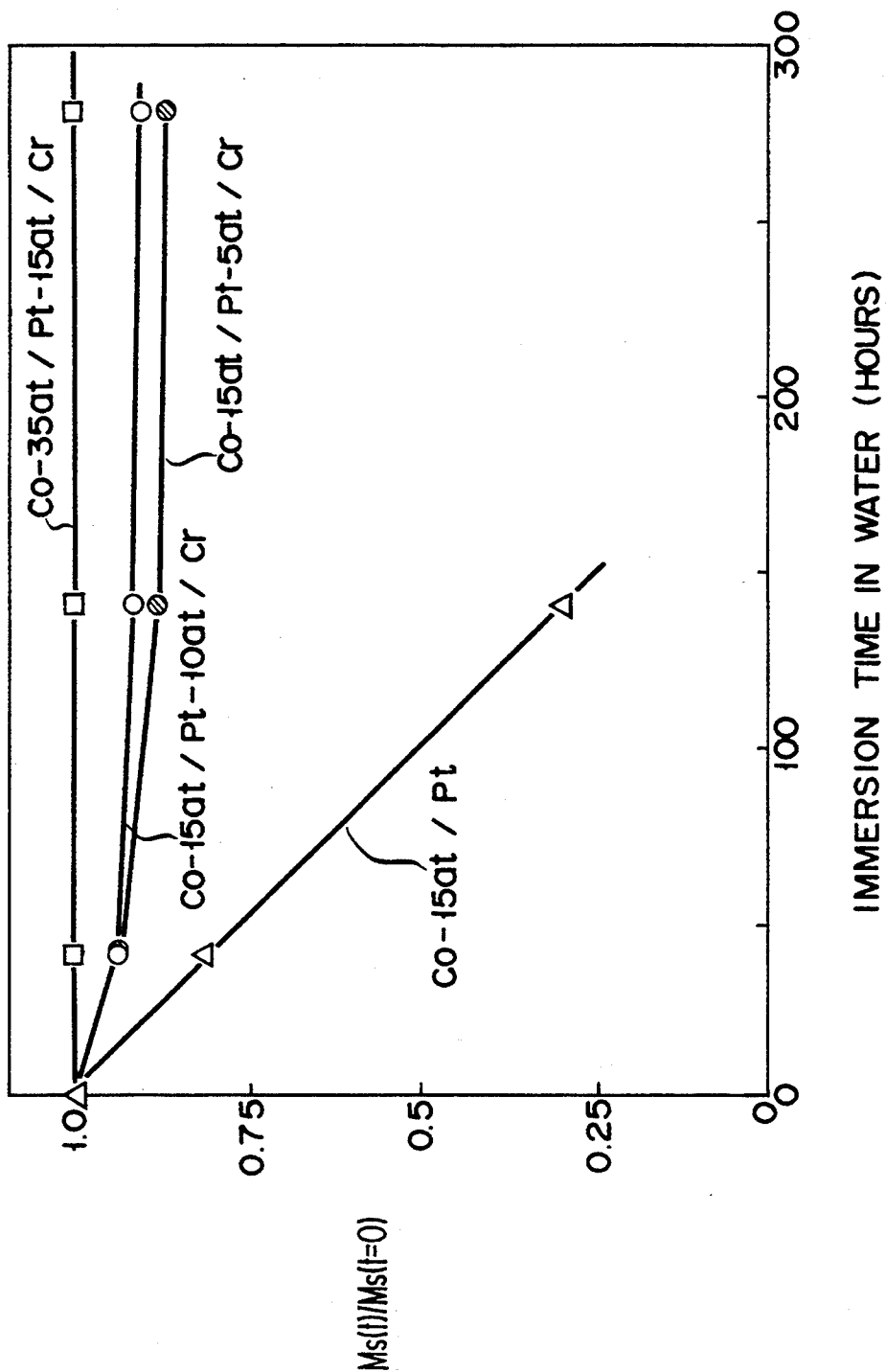
FIG. 9 shows the corrosion resistance in water of a sample of magnetic recording medium manufactured in Example 1.

FIG. 9 shows the results. It is seen that magnetic recording media including magnetic layers containing 5 to 15 atomic % of Cr are superior in corrosion resistance to the medium in which Cr is not contained in the magnetic layer.

EXAMPLE 2

Magnetic recording media were manufactured under the conditions given below:
  Apparatus: RF sputtering apparatus
  Substrate: Disc of NiP-plated Al, glass or polyimide film
  Substrate temperature: Room temperature or 250° C.
  Atmosphere: Ar gas containing $N_2$ gas
  Pressure: 0.1 to 3 Pa
  Composition of magnetic layer: $Co_{1-x-y}Pt_xCr_y$
  Thickness of magnetic layer: 500 Å

The squareness and coercivity of the manufactured magnetic recording media were measured relative to the $N_2$ content in the sputtering gas. Where the sputtering gas consisted of a pure Ar gas, the squareness was 0.6 or more under the Pt content X of $0.15 < X \leq 0.35$ and Cr content Y of $0 < Y \leq 0.05$. However, the squareness was lowered where the Pt content X was $0.15 < X \leq 0.35$ and Cr content Y was $0.05 < Y \leq 0.15$. On the other hand, where 1 to 15% by volume of $N_2$ was added to the sputtering gas of Ar, the squareness was as high as 0.65 or more regardless of increase in the Cr content in the magnetic layer.

Let us compare Examples 1 and 2 with respect to the case where the sputtering gas consists of a pure Ar gas. In Example 1, the squareness is lowered in the case where the Pt and Cr contents are lower than in Example 2. The difference is derived from the difference in the film-forming rate between the DC magnetron sputtering apparatus used in Example 1 and the RF sputtering apparatus used in Example 2. In the case of using a DC magnetron sputtering apparatus, which permits a high forming rate of a magnetic layer, as in Example 1, the squareness tends to be lowered.

Figure 10:
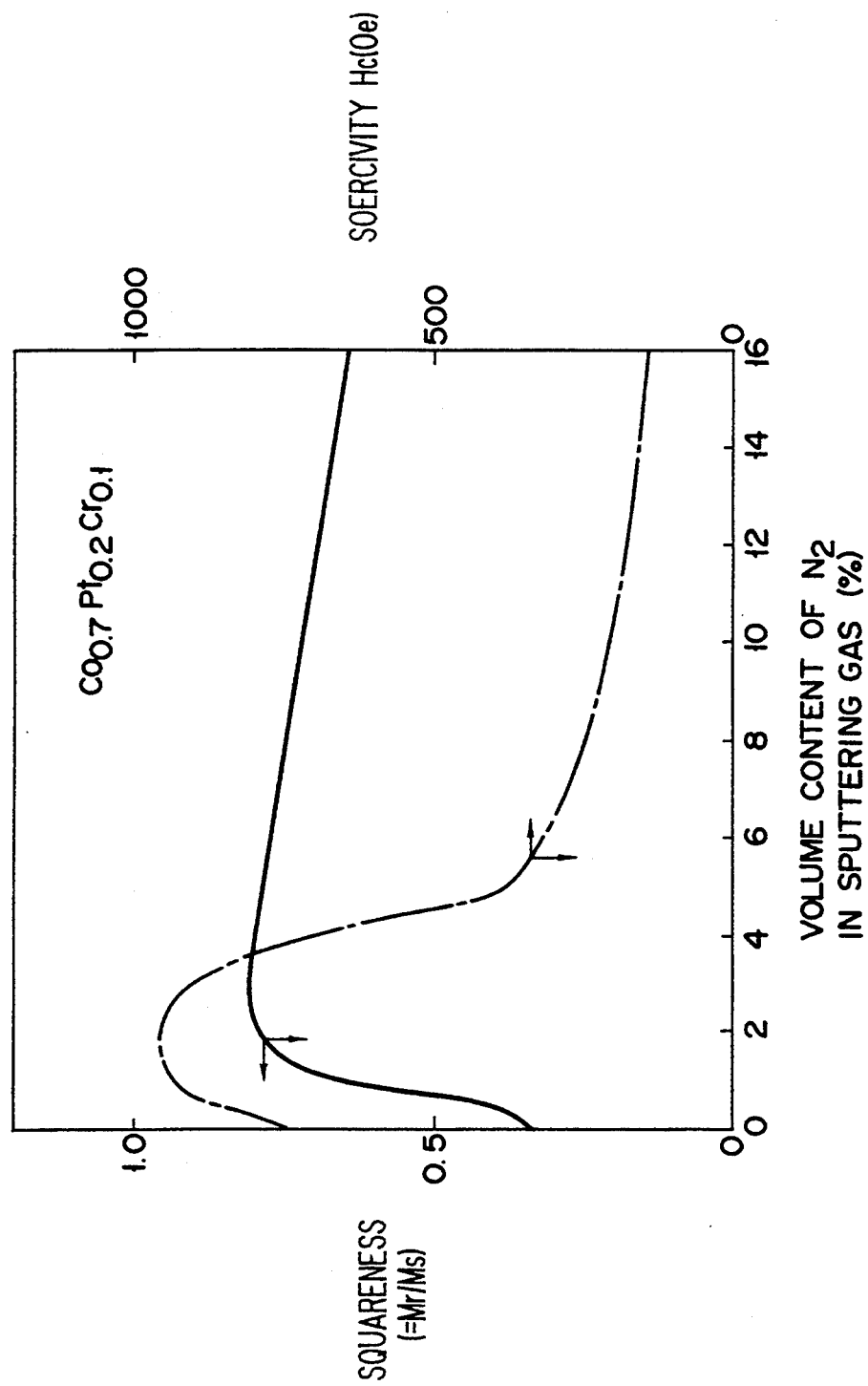
FIG. 10 shows the relationship among the $N_2$ content in the sputtering gas, the squareness and the coercivity, with respect to a sample of magnetic recording medium manufactured in Example 2.

As an example, a magnetic layer of $Co_{0.7}Pt_{0.2}Cr_{0.1}$ was formed on a NiP-plated Al substrate under a sputtering gas pressure of 0.6 Pa. The substrate temperature was set at room temperature, and the $N_2$ content in the sputtering gas was changed variously. FIG. 10 shows changes in the squareness and the coercivity of the manufactured magnetic recording media relative to the change in the $N_2$ gas content in the sputtering gas. It is seen that the squareness is 0.65 or more where the $N_2$ content in the sputtering gas falls within the range of between 1% and 15% by volume.

Further, the crystal orientation of the magnetic layer evaluated from the X-ray diffraction was found to be deeply related to the squareness in Example 2 as in Example 1. Still further, the magnetic recording medium comprising a magnetic layer containing 5 to 15 atomic % of Cr was found to be superior in corrosion resistance and noise suppression to the medium in which the Cr content in the magnetic layer was less than 5 atomic %.

EXAMPLE 3

Magnetic recording media were manufactured under the conditions given below:
  Apparatus: RF magnetron sputtering apparatus
  Substrate: Disc of NiP-plated Al, glass or polyimide film
  Substrate temperature: Room temperature or 250° C.
  Atmosphere: Ar gas containing $O_2$ gas
  Pressure: 0.1 to 3 Pa
  Composition of magnetic layer: $Co_{1-x-y}Pt_xCr_y$
  Thickness of magnetic layer: 500 Å

The squareness and coercivity of the manufactured magnetic recording media were measured relative to the $O_2$ content in the sputtering gas. Where the sputtering gas consisted of a pure Ar gas, the squareness was 0.6 to 1.0 under the Pt content X of $0.15 < X \leq 0.35$ and Cr content Y of $0 < Y \leq 0.05$. However, the squareness was lowered where the Pt content X was $0.15 < X \leq 0.35$ and Cr content Y was $0.05 < Y \leq 0.15$. On the other hand, where 1 to 15% by volume of $O_2$ was added to the sputtering gas of Ar, the squareness was as high as 0.65 to 1.0 regardless of increase in the Cr content in the magnetic layer.

Further, the crystal orientation of the magnetic layer evaluated from the X-ray diffraction was found to be deeply related to the squareness in Example 3 as in Example 1. Still further, the magnetic recording medium comprising a magnetic layer containing 5 to 15 atomic % of Cr was found to be superior in corrosion resistance and noise suppression to the medium in which the Cr content in the magnetic layer was less than 5 atomic %.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A magnetic recording medium, comprising a substrate and a crystalline longitudinal magnetic recording layer having longitudinal magnetic anisotropy formed on the substrate, said magnetic recording layer having a composition of:

$$Co_{1-x-y}Pt_xCr_y, (0.15 < x \leq 0.35; 0 < y \leq 0.15)$$

and containing at least one of oxygen and nitrogen in a concentration less than $2.5 \times 10^{21}$ atom/cm³ and greater than $0.9 \times 10^{21}$ atom/cm³; and
  wherein a squareness ratio of said magnetic layer is greater than 0.65.

2. The magnetic recording medium according to claim 1, wherein the oxygen and/or nitrogen content in the magnetic layer is 0.7 to $1.5 \times 10^{21}$ atom/cm³.

3. The magnetic recording medium according to claim 1, wherein the Cr content y in the magnetic layer is $0.05 < y \leq 0.15$.

4. A magnetic recording medium according to claim 1, wherein said magnetic layer contains nitrogen in a concentration of less than $2.5 \times 10^{21}$ atom/cm³ and greater than $0.9 \times 10^{21}$ atom/cm³.

5. A magnetic recording medium according to claim 1, wherein:
  said substrate is non-magnetic and said magnetic layer is in contact with said non-magnetic substrate.

6. A method of manufacturing a longitudinal type crystalline recording medium, comprising the step of forming on a substrate a longitudinally anisotropic magnetic layer having a composition of:

$$Co_{1-x-y}Pt_xCr_y, (0.15 < x \leq 0.35; 0 < y \leq 0.15)$$

said magnetic layer being formed by sputtering method under an inert gas atmosphere containing 0.1 to 10% by volume of at least one of $N_2$ and $O_2$, wherein a squareness ratio of said magnetic layer is greater than 0.65.

7. The method according to claim 6, wherein the $N_2$ and/or $O_2$ content in the atmosphere is 1 to 10% by volume.

8. The method according to claim 6, wherein the Cr content y in the magnetic layer is $0.05 < y \leq 0.15$.

9. The method according to claim 6, wherein the pressure of the inert gas atmosphere is 0.1 to 3 Pa.

10. A magnetic recording medium, comprising a substrate and a crystalline longitudinal magnetic recording layer having longitudinal anisotropy formed on the substrate, the magnetic recording layer having a composition of:

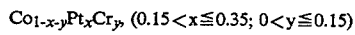

$Co_{1-x-y}Pt_xCr_y$, $(0.15 < x \leq 0.35; 0 < y \leq 0.15)$ and containing at least one of oxygen and nitrogen in a concentration of less than $2.5 \times 10^{21}$ atom/cm$^3$ and greater than $0.9 \times 10^{21}$ atom/cm$^3$; and
wherein the magnetic recording layer has a squareness ratio of greater than 0.5.

11. A magnetic recording medium according to claim 10, wherein the magnetic recording layer has a coercivity of greater than 500 Oersted.

12. A magnetic recording medium according to claim 10, wherein the magnetic recording layer contains nitrogen in a concentration of less than $2.5 \times 10^{21}$ atom/cm$^3$ and greater than $0.9 \times 10^{21}$ atom/cm$^3$.

13. A magnetic recording medium according to claim 10, wherein the substrate is non-magnetic and the magnetic recording medium is in contact with a surface of said non-magnetic substrate.

14. A magnetic recording medium according to claim 10, wherein y=0.03 and x=0.2.

15. A magnetic recording medium according to claim 10, wherein y=0.10 and x=0.18.

16. A magnetic recording medium according to claim 10, wherein y=0.05.

17. A magnetic recording medium according to claim 10, wherein y=0.1 and x=0.2.

18. A magnetic recording medium according to claim 10, wherein the magnetic recording layer has a thickness of about 500 Å.

19. A magnetic recording medium according to claim 10, wherein the magnetic recording layer has a coercivity of greater than 900 Oersted.

20. A magnetic recording medium according to claim 13, wherein said surface of the substrate has a composition selected from a member of the group consisting of glass, polyimide, and NiP.

* * * * *